United States Patent [19]

Mathes et al.

[11] 4,391,268
[45] Jul. 5, 1983

[54] SOLAR WATER HEATER CONTROL AND PROTECTION SYSTEM

[75] Inventors: Donovan B. Mathes; Floyd B. Hamilton; Douglas C. Spreng, all of Lake Havasu City, Ariz.

[73] Assignee: Solar Dynamics Inc., Lake Havasu, Ariz.

[21] Appl. No.: 238,108

[22] Filed: Feb. 24, 1981

[51] Int. Cl.³ ............................................... F24J 3/02
[52] U.S. Cl. ................................... 126/437; 126/420; 137/627.5
[58] Field of Search ................ 126/420, 437; 137/637, 137/627.5

[56] References Cited

U.S. PATENT DOCUMENTS 4,191,166  3/1980  Saarem et al. ................ 126/420 X
4,244,352  1/1981  Foster .............................. 126/420 X Primary Examiner—William E. Wayner
Attorney, Agent, or Firm—Harry M. Weiss

[57] ABSTRACT

This disclosure relates to a control and protection system for a solar water heater apparatus, which incorporates a temperature differential controlled variable speed drive for the circulating pump, and a drain down valve which is responsive to low collector temperature, high tank temperature and also to power loss, to serve in combination as a device to optimize efficient energy collection while also protecting the tank against overheating and further protecting the collector panel against freeze-up even during periods of power loss.

2 Claims, 5 Drawing Figures

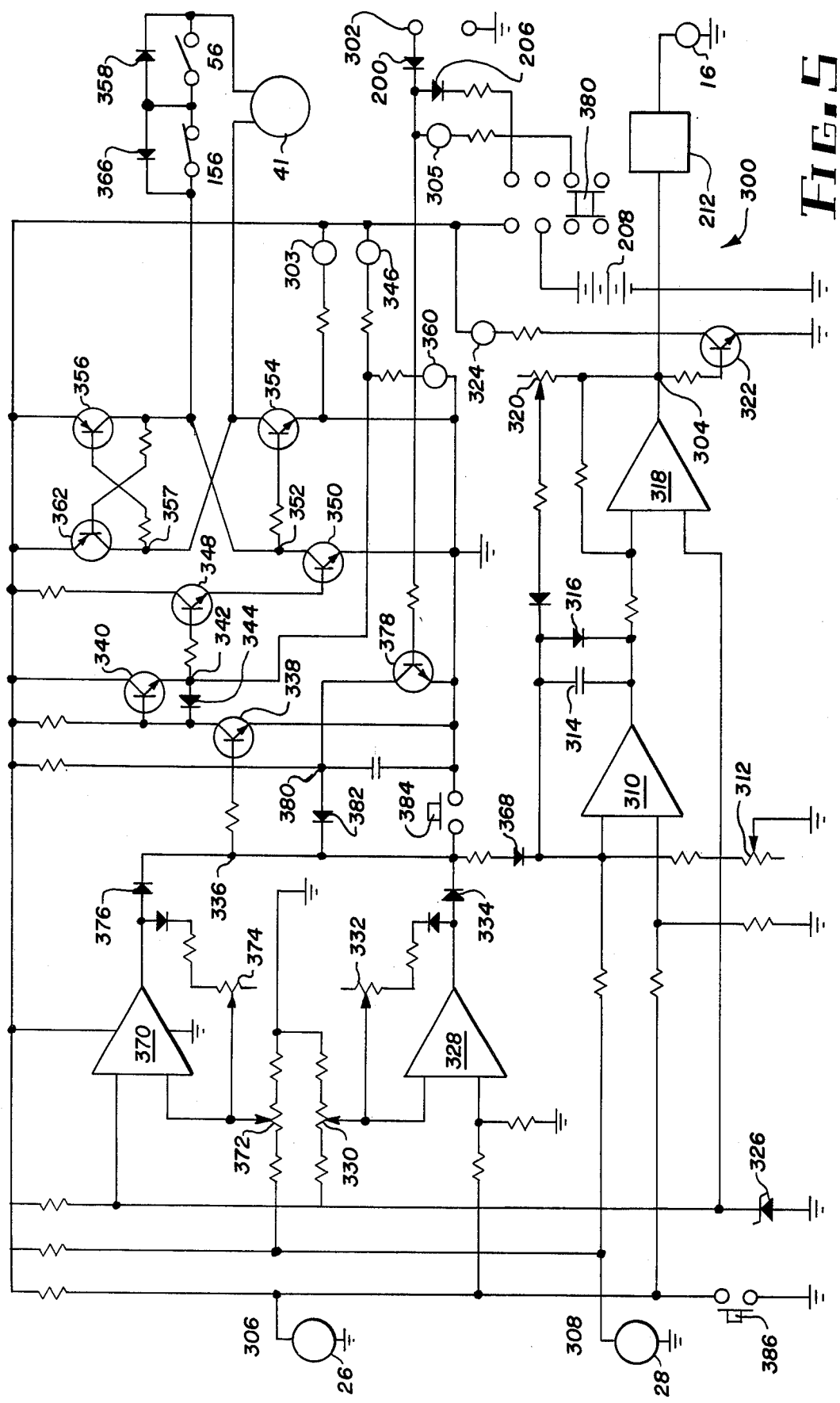

SOLAR WATER HEATER CONTROL AND PROTECTION SYSTEM

BACKGROUND OF THE INVENTION

1. Field of the Invention

This invention relates generally to solar water heaters and, more specifically, to a control and protection system for a solar water heater, which optimizes energy collection by varying the circulating pump speed in proportion to the available temperature differential, provides freeze-up protection for the collector panel, and prevents an overheating of the reservoir tank.

2. Description of the Prior Art

In the past, the rising cost of energy has fostered the popularity of various direct conversion solar energy devices. Among the most popular of such devices was the domestic hot water heating system, wherein exposed collector panels absorbed radiant energy and transferred that energy to water or other working fluid to ultimately provide hot water at a temperature compatible with domsetic use. Most typically, the circulating fluid was simply water intended for use, minimizing system expense.

In such a circulating water system, however, several problems were presented. Among these problems was the possibility of freeze-up of the circulating fluid in the collector panel during periods of low ambient temperature, which resulted in the destruction of the panel itself. Although various attempts were made to solve the freeze-up problem, the solutions of the prior art left yet another problem, in that those devices required that the system power source remain operational to drain or otherwise protect the collector panel. Thus, where low temperatures were preceded by a power loss, the collector panel was substantially unprotected against freeze-up.

A need existed for a control and protection system for a solar hot water heater apparatus which could protect the collector panel against freeze-up even after line power had failed.

BRIEF DESCRIPTION OF THE DRAWING

FIG. 5 is a schematic of a circuit embodying the functions of the block diagram of FIG. 4.

SUMMARY OF THE INVENTION

In accordance with one embodiment of this invention, it is an object to provide a control and protection system for a solar water heater apparatus.

It is another object to provide an apparatus for protecting a solar collector panel against freeze-up even after loss of line power.

It is a further object to provide a device for operating the circulating pump of a solar water heater apparatus at a rate proportional to the temperature differential between the fluid in the collector panel and the fluid in the reservoir tank.

It is another object to provide a device for preventing the fluid in the tank of a solar water heater apparatus from becoming overheated.

It is still a further object to provide a drain down valve for a solar water heater apparatus which seals the balance of the water system from the collector panel prior to draining the panel to provide freeze-up protection.

It is again another object to provide a drain down valve for a solar water heater apparatus which valve requires only a single motor to both seal the balance of the water system from the collector panel prior to drain down and also to vent the panel itself to drain the fluid therefrom.

DESCRIPTION OF THE PREFERRED EMBODIMENTS

In accordance with one embodiment of this invention, in a solar water heater system having an electrical power input, a collector panel, a tank and a circulating pump, a control system in disclosed, comprising: valve means for permitting the collector panel to be drained to prevent freeze-up; panel sensor means for providing a signal corresponding to the temperature of fluid in the collector panel; tank sensor means for providing a signal corresponding to the temperature of fluid in the tank; and pump drive means for operating the circulating pump at a rate corresponding to the difference between the signal from the panel sensor means and the signal from the tank sensor means.

In accordance with another embodiment of this invention, in a solar water heater system having a collector, a tank, a feed conduit and a return conduit, a drain down valve is disclosed, comprising: isolating means for selectively sealing first portions of both the feed conduit and the return conduit so that the tank remains sealed when drain down occurs; and venting means for unsealing second portions of both the feed conduit and the return conduit so that fluid in the collector and in the second conduit portions can be drained.

The foregoing and other objects, features and advantages will be apparent from the following, more particular, description of the preferred embodiments of the invention, as illustrated in the accompanying drawings.

Figure 1:
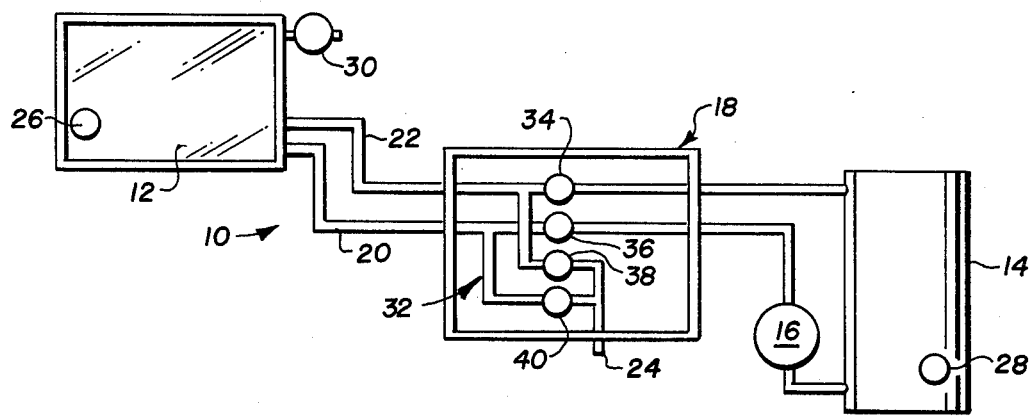
FIG. 1 is a schematic overview of the control and protection system disclosed herein.

Referring to FIG. 1, a functional schematic of a solar water heater system is shown generally by reference number 10. The solar heater system includes a collector panel 12, a hot water reservoir 14 and a circulating pump 16, which are devices old in the art. The solar heater system 10 also includes a control system as shown generally by reference number 18. The control system 18 manages the operation of the solar heater system 10 by: controlling the rate of operation of the pump 16 as a function of the temperature differential existing between the panel 12 and the tank 14; draining down the panel 12 along with the input and output pipes 20, 22 through a drain-down outlet 24 when the absolute temperature in the panel 12 falls below an adjustable preset point, or the temperature in the tank 14 exceeds an adjustably preset level, or upon a loss of power so that freeze-up cannot occur during the period of power loss. The control system 18 has a panel temperature sensor 26 arranged to monitor the fluid temperature in the tank 14. A self-sealing vent 30 is also provided to facilitate the drain down operation at the command of the control system 18.

The control system 18 is shown provided with a valve assembly 32, conntected into both the panel feed pipe 20 and the panel return pipe 22. The valve assembly 32 is for both mechanically sealing and unsealing the drain down outlet 24 and for isolating the tank 14 from the panel 12 and the drain down outlet 24 during the drain down operation. The valve assembly 32 is provided with 4 valves, as shown by reference numbers 34, 36, 38, 40. In the preferred embodiment, each of the valves 34, 36, 38, 40 is a ball valve. Valves 34 and 36 are isolation valves for sealing the tank 14, and other portions of the water system which continue to function, from both the panel 12 and drain down outlet 24 when drain down occurs. Valves 38 and 40 are drain down valves for draining the pipes 20, 22 leading to the panel 12. Draining the pipes 20, 22 allows air to enter through self-sealing valve 30 to thereby duct the fluid from the panel 12 and the pipes 20, 22 through the outlet 24.

Figure 2:
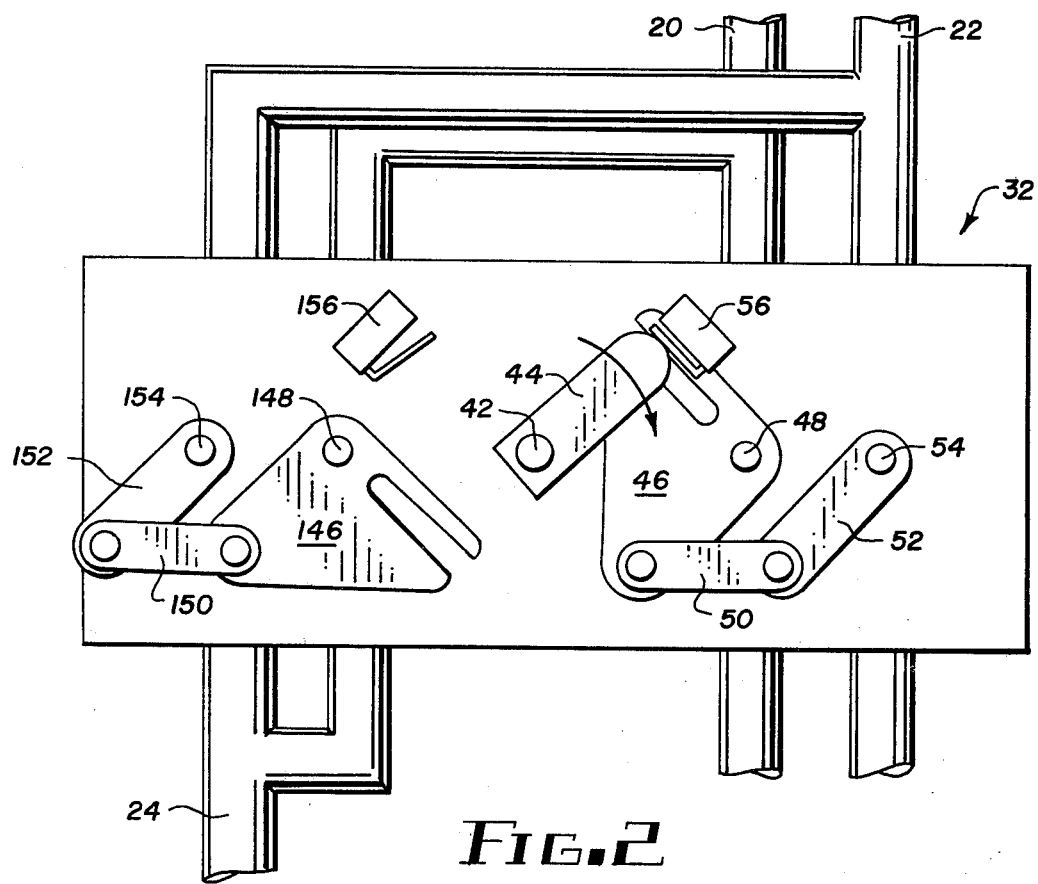
FIG. 2 is a frontal view of the valve of FIG. 1 in the normal operating mode.

Referring then to FIG. 2, the valve assembly 32 is illustrated with a drive linkage apparatus, including a reversible valve motor 41 (refer also to FIG. 4) whose output shaft is shown at 42. A cam 44 is coupled to the output shaft 42. The cam 44 is provided with a projecting pin (not shown) which engages a first slotted cam follower 46. The cam follower 46 is coupled to the actuating shaft 48 of the rotatably operated isolation valve 36. A link 50 is pivotally coupled to the actuating shaft 54 of the other rotatably operated isolation valve 34. Thus rotation of the valve motor shaft 43 in the direction shown by the arrow shifts the cam follower 46, with a corresponding rotation of the valve shafts 48, 54 which tends to close the isolation valves 36, 34. As the cam 44 rotates away from its initial position, at which point the isolation valves 34, 36 were fully open, the cam also breaks the continuity across a normal mode limit switch 56.

Similar arrangement of a cam follower 146, a link 150 and an arm 152 is connected in combination to the actuating shafts 148, 154 of the drain down valves 38, 40. A drain down mode limit switch 156 limits rotation of the cam 44, as hereafter explained in connection with FIG. 5.

Figure 3:
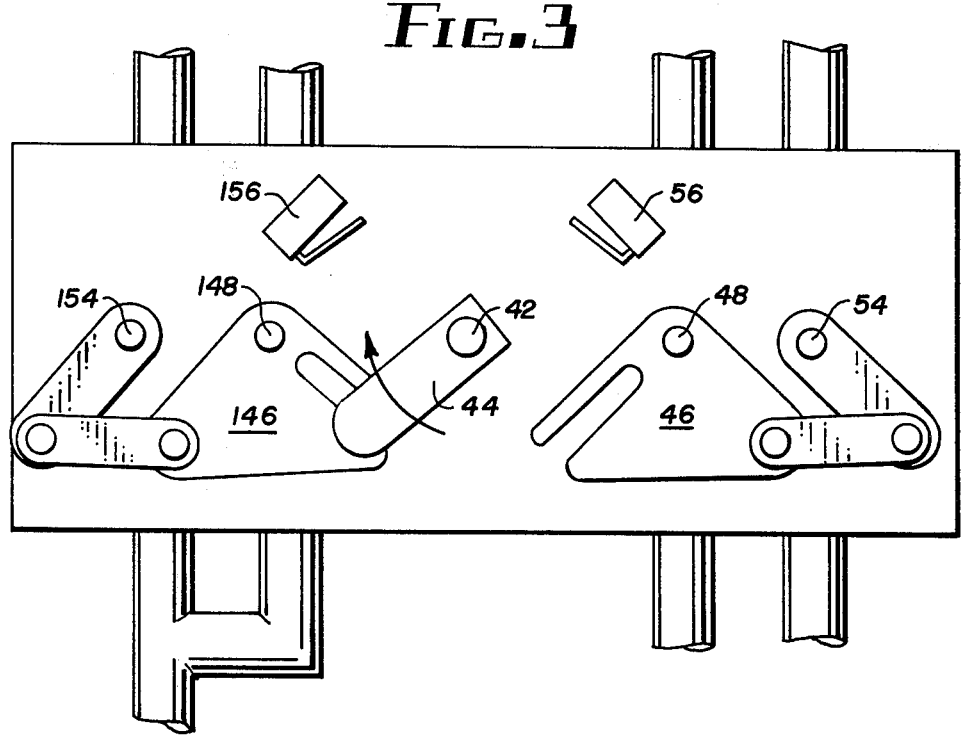
FIG. 3 is a frontal view of the valve of FIG. 2 being shifted from the normal operating mode to the drain down mode.

Referring further to FIG. 3, the valve apparatus 32 of FIG. 2 is shown after the cam 44 has been rotated to fully close the isolation valves 34, 35, and the pin of the cam 44 has entered the slot of the drain down cam follower 146 to begin to open the drain down valves 38, 40. Rotation continues in the direction shown by the arrow until the cam contacts the actuator of the limit switch 156 to break the driving circuit. Thus, in the system 10 the solar panel 12 is first isolated from the remainder of the water system before the panel drain down is initiated. As closure of the isolation valves 34, 36 removes pressure source, including the pump 16 and the fluid inlet to the tank 14, an opening of the drain down valves by the continued rotation of the cam 44 permits the fluid in the panel 12 ad the pipes 20, 22 to be gravitationally drawn down through the drain outlet 24 as air enters through the self sealing valve 30.

Figure 4:
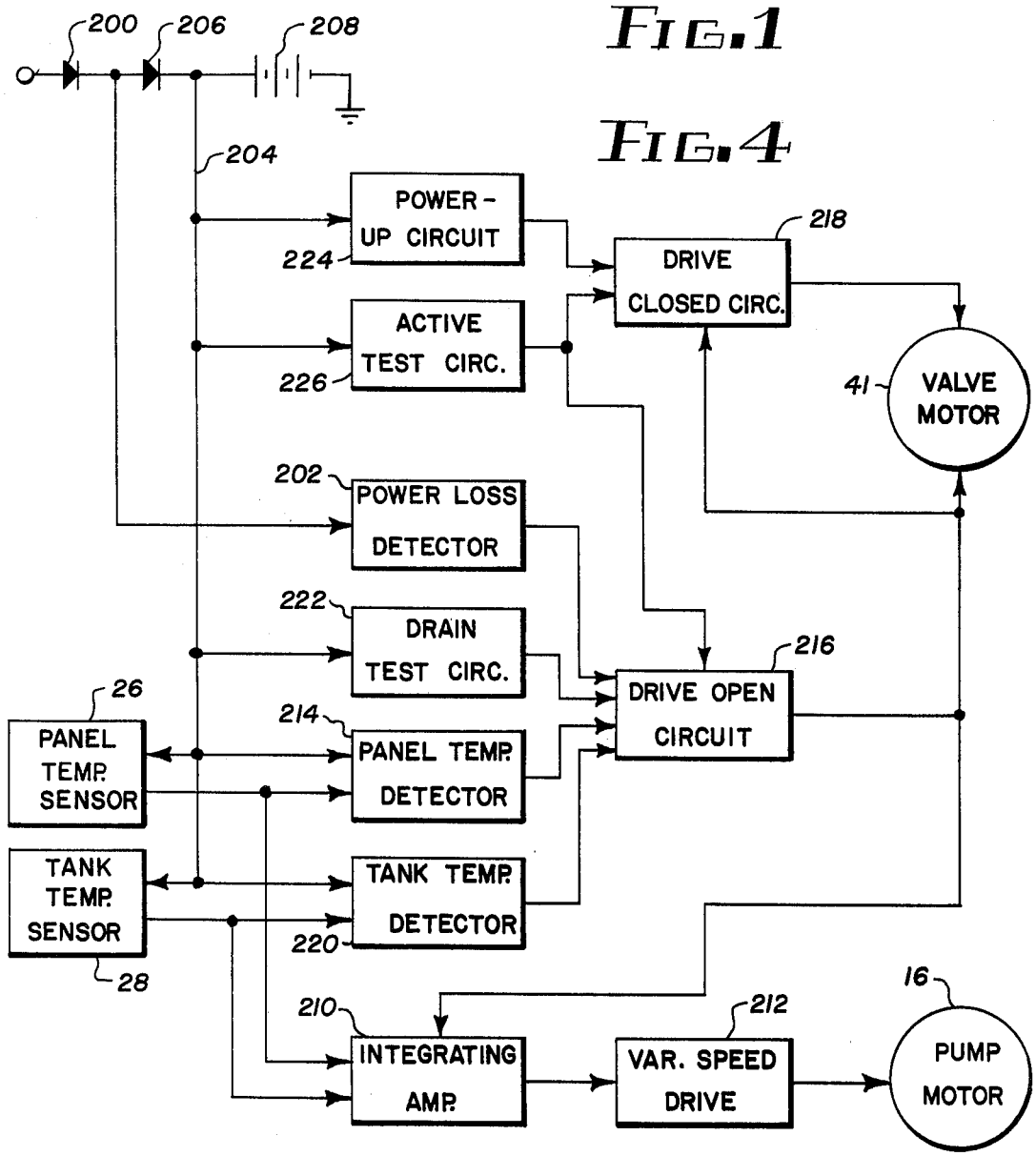
FIG. 4 is a block diagram of the electrical functions of the control and protection system of FIG. 1.

Referring to FIG. 4, a block diagram of the electrical functions of the solar water heater control system 18 is shown. The control system 18 has a rectifying diode 200 which is connected to an AC power source to provide a DC input to the balance of the system 18. The rectified input is conducted directly to a power loss detector circuit 202, and is also connected to a system power bus 204 via isolating diode 206. The diode 206 permits a battery 208 to continue to power the system 18 even in the even of power loss. The system bus 204 is connected to the panel temperature sensor 26 and to the tank temperature sensor 28, which respectively provide output signals corresponding to the temperature in the panel 12 and the tank 14.

The signals from the panel sensor 26 and the tank sensor 28 are connected as differential inputs to integrating amplifier 210. The output of the integrating amplifier 210 controls the duty cycle of a variable speed pump drive circuit 212, which in turn operates the motor of the circulating pump 16 at a speed proportional to the temperature differential between the panel 12 and the tank 14.

The signal from the panel sensor 26 is also connected to a panel low temperature detector circuit 214. The panel low temperature detector circuit 214 output triggers a drive open circuit 216 when the temperature in the panel falls to a preset level. The output of the drive open circuit 216 drives the valve motor 41 to change the open and closed positions of the isolation valves 34, 36, and the drain down valves 38, 40. The output of the drive open circuit 216 also disengages the output of the integrating amplifier 210, and further disengages a drive closed circuit 218.

The signal from the tank sensor 28 is connected to a tank overheat detector circuit 220. The tank overheat circuit 220 output triggers the drive open circuit 216 when the temperature in the tank 14 is too high, causing the pump 16 to quit, draining down the collector panel 12, and preventing further heat addition to the tank 14.

The power loss detector circuit 202 is arranged to trigger the drive open circuit 216 upon loss of external power, assuring that freeze-up does not occur within the collector panel 12 during a period of power loss. As the battery 208 provides a power backup, the drive open circuit 216 and the drain down valve motor 41 continue to function even after a power loss.

A drain down test circuit 222 is provided to permit a manual triggering of the drive open circuit 216 for test purposes.

To permit a reactivation of the heater system after having been drained down, the control system 18 has the drive closed circuit 218. The drive closed circuit 218 is provided with a continuous triggering signal from a power-up circuit 224. The power-up circuit 224 provides an output as long as power is available from the external power source through diode 200. However, a signal from the drive open circuit 216 disengages the drive closed circuit 218. Thus, when the signal triggering the drive open circuit 216 is removed and AC power input is available, the valve motor 41 automatically shuts the drain down valves 38, 40 and opens the isolation valves 34, 36.

The drive closed circuit 218 can be triggered by an input from an active test circuit 226. However, the active test circuit 226 is operable only while the drive open circuit 216 is operational. To define a priority of control, the active test circuit 226 overrides and disengages the drive open circuit 216.

Referring then to FIG. 5, a schematic of a circuit 300 embodying the functions of the block diagram of FIG. 4 is shown. External connections to the circuit 300 include a 12-volt AC power input at 302, an output to the variable speed pump drive circuit 212 at 304, a signal input at 306 from the panel temperature sensor 26, and a signal input at 308 from the tank sensor 28. The panel sensor 26 and the tank sensor 28 provide voltage signals proportional to the corresponding liquid temperatures. The variable speed pump drive circuit 212 drives the motor of the pump 16 at a speed corresponding to the duration of the pulses of a square wave appearing at node 304, in a known manner.

A power on indicator LED is shown at 303. LED 305 indicates when the battery 208 is being charged.

The signals provided by the panel sensor 26 and the tank sensor 28 are connected as differential inputs to op amp 310. Variable resistor 312 allows adjustment of the differential offset to which the op amp 310 responds. Capacitor 314 is connected between the output from the op amp 310 and the tank sensor 26 to the op amp 310, resulting in circuit operation as the integrating amplifier 210. A diode 316 is provided to prevent excessive potential from occuring across capacitor 314 when the signal from the panel sensor 26 falls to a very low level. The output of the op amp 310 and a reference voltage are input to op amp 318. The op amp 318 output is fed back via adjustable resistor 320 to dischage capacitor 314 and cause the circuit to function as a Schmitt trigger, providing the low frequency square wave which drives the variable speed pump drive circuit 212. The output from the op amp 318 also switches the transistor 322 on, providing a ground for LED 324 to indicate that the pump 16 is in operation.

The signal from panel sensor 26 and a reference voltage established by zener diode 326 are inputs to op amp 328, which is wired as a differential amplifier to function as the panel low temperature detector circuit 214. The signal from the panel sensor 26 is connected to the non-inverting input of op amp 328 via variable resistor 330, which allows adjustment of the trip point for the op amp 328. The output from op amp 328 is fed back to the non-inverting input through variable resistor 332 to provide a hysteresis adjustment between the panel low temperature detector circuit 214 trip and reset points.

The panel low temperature detector circuit 214 output is connected via diode 334 and node 336 to the drive open circuit 216 at the base of transistor 338. Voltage appearing at the base of transistor 338 switches the transistor 338 on, which shuts off transistor 340 and pulls node 342 low via diode 344. LED 346 is thus grounded through node 342, and lights to indicate that drive open circuit 216 is in operation. Grounding node 342 also shuts off transistor 348, which correspondingly shuts off transistor 350. Switching transistor 350 off causes voltage to appear at node 352 and turn transistor 354 on. Activation of transistor 354 pulls node 357, connected to the base of PNP transistor 356, low, thereby switching transistor 356 on and driving the valve motor 41, through limit switch 156 and diode 358 to open the drain down valves 38, 40. When the valves 38, 40 reach the fully open position, the cam 44 makes contact with the limit switch 156 and the connection across the switch is broken, shutting off the motor 41. The valve motor 41 is thus driven to open the drain down valves 38, 40 any time that the limit switch 156 is closed and voltage appears at node 336.

When voltage is removed from node 336, which would also be the condition at power-up, transistor 338 is shut off, allowing the base of transistor 340 to go high and switch on. Voltage appearing at node 342 is grounded via LED 360 to indicate that the drive closed circuit 218 is driving the isolation valves 34, 36 open and is drawing the drain down valves 38, 40 shut. Voltage at node 342 turns on transistors 34B and 350, which pulls node 352 low, shutting off transistor 354 and turning on transistor 362. Voltage at node 357 drives the valve motor 41, which ground or via closed limit switch 56 and either diode 366 or switch 156, toward the closed position. Thus, the same components function as the drive open circuit 216, the drive closed circuit 218 and the power-up circuit 224.

Voltage appearing at node 336 is also conducted via diode 368 to the inverting input of op amp 310, to in turn shut off the pump drive circuit 212.

The signal from tank sensor 28 and a reference voltage are connected as inputs to op amp 370, which functions as the tank overheat detector circuit 220. The reference voltage is connected to the inverting input of the op amp 370. The output of the tank sensor 28 is connected to the non-inverting input of the op amp 370 via variable resistor 372 to permit adjustment of the trip point, or temperature at which the tank overheat circuit 220 will cause a drain down of the collector panel 12. The output of op amp 370 is fed back via variable resistor 374 to permit adjustment of the hysteresis between the trip and reset points for the tank overheat detector circuit 220. Output from op amp 370 also appears at node 336 via diode 376, and triggers the drive open circuit 216 in the manner previously described.

Transistor 378 is connected as the power loss detector circuit 202. While all other components in the control system 18 are provided with power from either AC input via rectifying diode, isolating diode 206 and switch 380, or from the battery 208 which is connected in parallel with the rectified source, the base of transistor 378 is connected only to the rectified AC source. Thus a loss of power switches transistor 378 off, causing node 380 to go high and voltage to be applied to node 336 via diode 382 to activate the drive open circuit 216 and disengage the pump drive circuit 212.

An active test switch 384 is provided to permit node 336 to be manually grounded, to test the performance of the drive closed circuit 218. A drain down test switch 386 is also included in the control circuit 18 to permit the inverting input of op and 328 of the panel overhead detector circuit 214 to be manually grounded, triggering the op amp 328 output, and causing voltage to appear at node 336 to initiate the drain down process for test purposes.

While the invention has been particulary shown and described with reference to preferred embodiments thereof, it will be understood by those skilled in the art that the foregoing and other changes in form and details may be made therein without departing from the spirit and scope of the invention.

I claim:

1. A solar water heater system wherein a collector receives a liquid from a tank through a feed conduit and provides said liquid to said tank through a return conduit, and first and second drain down valves connected to said first and second conduits, respectively, are operable to drain said liquid from said system, comprising:

first and second isolating valves respectively situated in said feed and return conduits that isolate said tank from said conduits when said fluid is being drained;

a venting valve connected to said collector and to the atmosphere that allows a flow of air therethrough into said conduits and said collector in response to said system being drained;

a reversible gear motor; and linkage means for sealing said isolating valves prior to opening said drain down valves and for closing said drain down valves prior to opening said isolating valves.

2. A valve in accord with claim 1 wherein said linkage means comprising:
- a cam having a protruding pin;
- said cam having a coupling to the output shaft of said gearmotor;
- said isolating valves and said drain down valves each having a rotatable actuating shaft;
- a first cam follower coupled to said actuating shaft of a first of said isolating valves and having a slot disposed to receive said pin so that said first cam follower can be reversibly driven by said cam;
- a first arm coupled to said actuating shaft of a second of said isolating valves;
- a first link coupling said first cam follower and said first arm so that rotation of said first cam follower causes a like rotation of said first arm to thereby actuate both of said isolating valves;
- a second cam follower coupled to said actuating shaft of a first of said drain down valves and having a slot disposed to receive said pin so that said second cam follower can be reversibly driven by said cam;
- a second arm coupled to said actuating shaft of a second of said drain down valves; and
- a second link rotatably coupled to both said second cam follower and to said second arm so that rotation of said second cam follower causes a like rotation of said second arm to thereby actuate both of said drain down valves.

* * * * *